United States Patent [19]
Moebius

[11] 3,827,727
[45] Aug. 6, 1974

[54] CONSTRICTOR RING AND TUBE JOINT

[76] Inventor: Kurt O. Moebius, P.O. Box 2625, Palos Verdes Peninsula, Calif. 90274

[22] Filed: June 26, 1972

[21] Appl. No.: 266,055

Related U.S. Application Data

[63] Continuation of Ser. No. 876,682, Nov. 14, 1969, abandoned.

[52] U.S. Cl. .................. 285/27, 29/508, 29/520, 285/115, 285/157, 285/287, 285/382.2, 285/417
[51] Int. Cl. ............................................. F16l 13/14
[58] Field of Search ......... 285/382.2, 382.1, 27, 94, 285/115, 157, 287, 417, 255, 382; 29/508, 520; 403/281, 285

[56] References Cited
UNITED STATES PATENTS

| | | | |
|---|---|---|---|
| 2,687,316 | 8/1954 | Voegeli | 285/382.2 |
| 3,124,874 | 3/1964 | Woolley | 285/382.2 X |
| 3,149,860 | 9/1964 | Hallesy | 285/382 X |
| 3,210,102 | 10/1965 | Joslin | 285/382.2 X |
| 3,467,414 | 9/1969 | Downing | 285/382.2 |
| 3,498,648 | 3/1970 | Hallesy | 285/382.2 X |
| 3,528,689 | 9/1970 | Roe | 285/382.2 |
| 3,674,292 | 7/1972 | Demler | 285/382 X |

FOREIGN PATENTS OR APPLICATIONS

| | | | |
|---|---|---|---|
| 1,140,797 | 3/1957 | France | 285/382 |
| 791,491 | 9/1935 | France | 285/417 |
| 986,617 | 4/1951 | France | 285/255 |

*Primary Examiner*—Thomas F. Callaghan
*Attorney, Agent, or Firm*—Lyon & Lyon

[57] ABSTRACT

A constrictor ring and tube joint formed thereby in which the constrictor ring is provided with a tapered bore and which is also tapered externally in such a manner that the end having the smaller internal diameter also has the greater external diameter. The constrictor ring is internally dimensioned to be partially received on a collar or coupling connecting the ends of two tubes placed in abutment or the enlarged or bell end of a tube which receives the plain end of a mating tube and then is forced over the collar or bell end to cause local annular compression of the collar or bell end sufficiently to cause corresponding annular compression of the tube within and produce a high strength fluid tight tube joint.

13 Claims, 14 Drawing Figures

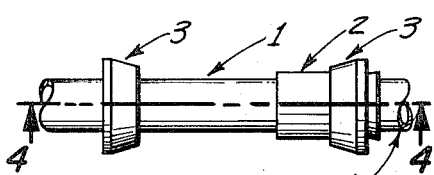 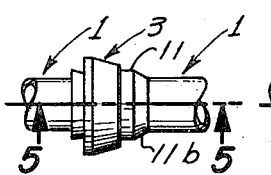 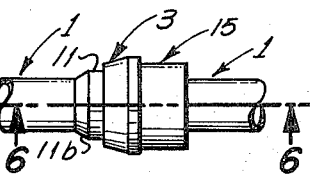
FIG. 1  FIG. 2  FIG. 3
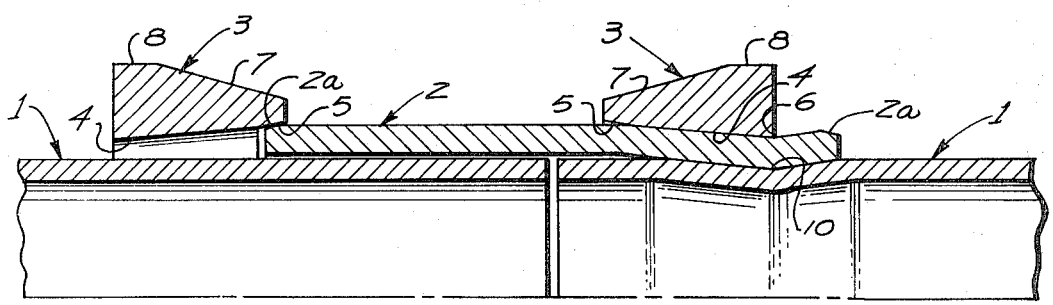
FIG. 4
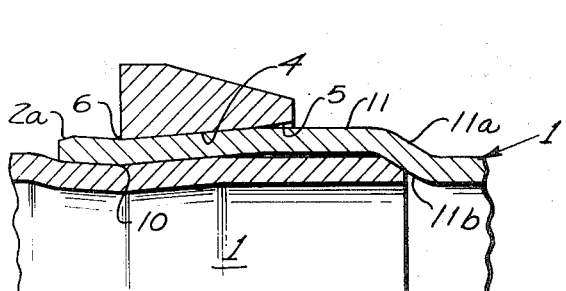 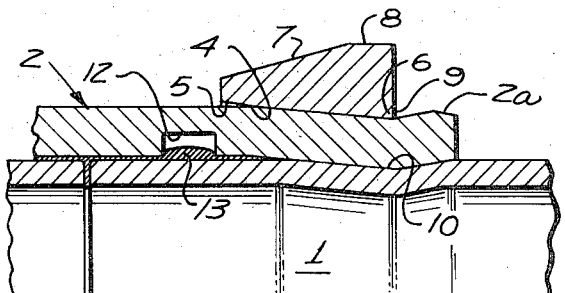
FIG. 5  FIG. 7
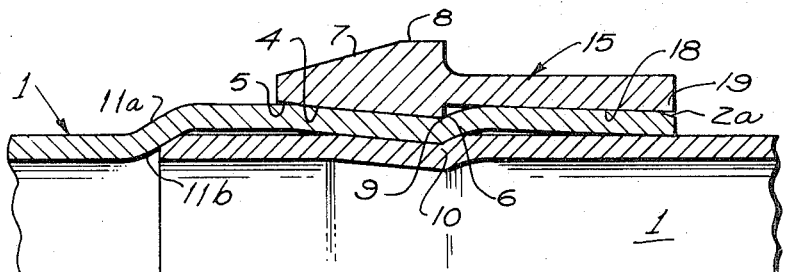
FIG. 6
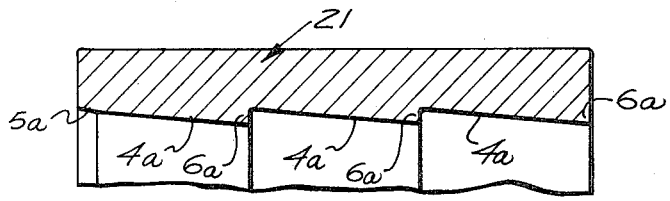 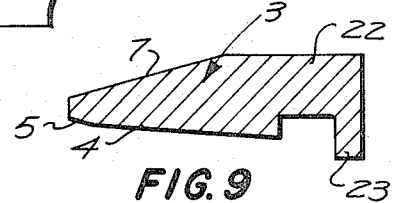
FIG. 8  FIG. 9

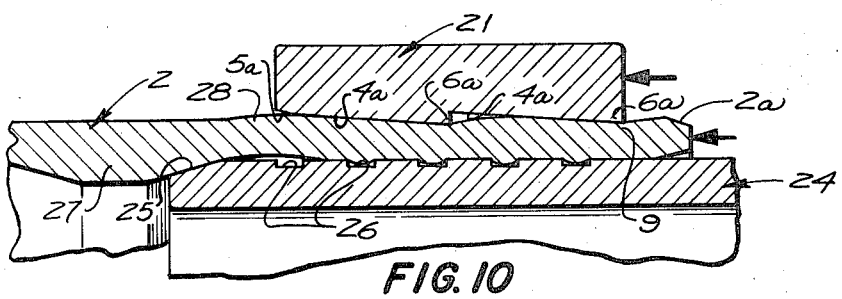
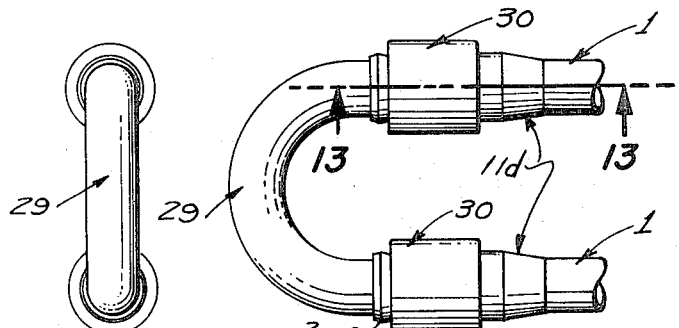
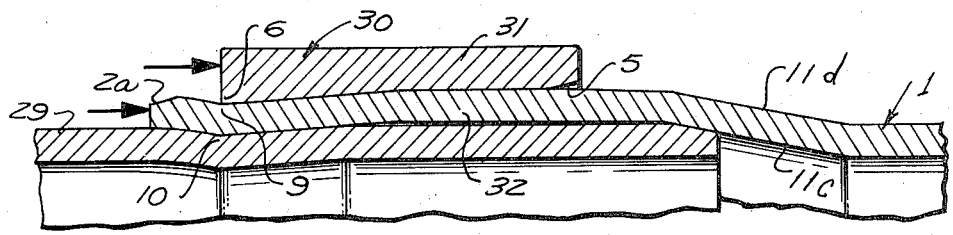
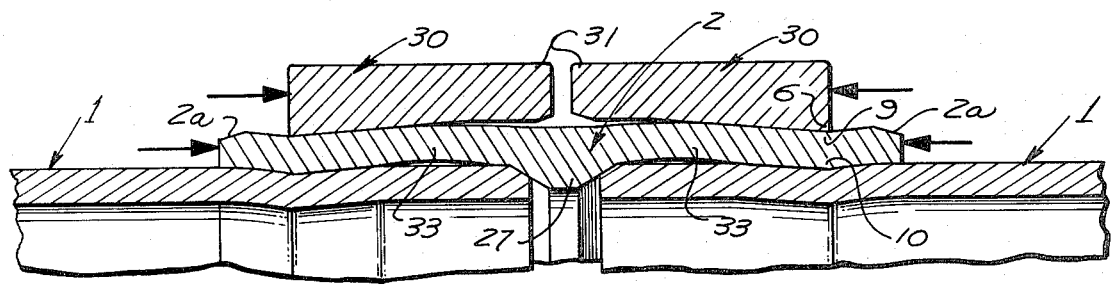

CONSTRICTOR RING AND TUBE JOINT

This is a continuation, of application Ser. No. 876,682 filed Nov. 14, 1969 and now abandoned.

SUMMARY OF THE INVENTION

The present invention is directed to a constrictor ring and tube joint formed thereby and is summarized in the following objects:

First, to provide a constrictor ring and tube joint which, when the constrictor ring is applied to a collar which receives a pair of tube ends in abutment, or when applied to the bell end of a tube which receives the plain end of a mating tube, effects local annular compression to the extent a seal as well as a mechanical bond is formed producing a dependable tube joint.

Second, to provide a constrictor ring and tube joint wherein the elements of the tube joint require no special preparation and assembly is completed by forcing the constrictor ring axially onto the joint.

Third, to provide a constrictor ring and tube joint wherein the constrictor ring is tapered both internally and, if desired, externally in such a manner that the radial thickness increases in proportion to the local hoop stress applied to the constrictor ring.

Fourth, to provide a constrictor ring of the type indicated in the preceding objects which may include an annular skirt extending axially from the larger end of the ring and tapered internally to compress an extremity of the tube joint into mutual engagement.

Fifth, to provide a constrictor ring which incorporates a locking shoulder adapted to resist removal of the locking ring once it has been installed.

Sixth, to provide a constrictor ring and tube joint which, while particularly adapted for direct bond between the elements of the tube joint, may be arranged for the introduction of solder, various epoxys or other sealing and bonding means.

Seventh, to provide a constrictor ring and tube joint, an embodiment of which is particularly adapted for the joining of an essentially non-deformable tube to a similar tube or to other apparatus by use of a deformable collar or sleeve which interlocks into grooves formed in the nondeformable tube.

Eighth, to provide a constrictor ring and tube joint wherein the constrictor ring is provided with a sleeve to guide the constrictor ring into place even though only part of the end of the guide ring is available for receiving axial force, thereby providing a construction which is particularly adapted for securing U-tubes to the ends of condenser or heat exchanger tubes.

DESCRIPTION OF THE DRAWINGS

FIG. 1 is a plan view of a tube joint, utilizing a collar or sleeve, showing one constrictor ring in position and one constrictor ring prior to being moved into position.

FIG. 2 is a similar plan view of a modified form of tube joint, in which one tube is provided with a bell end, the constrictor ring being shown in position.

FIG. 3 is another plan view, showing a modified form of the constrictor ring.

FIG. 4 is an enlarged fragmentary sectional view, taken through 4—4 of FIG. 1.

FIG. 5 is an enlarged fragmentary sectional view, taken through 5—5 of FIG. 2.

FIG. 6 is a fragmentary sectional view, taken through 6—6 of FIG. 3, showing a modified form of the collar.

FIG. 7 is a fragmentary sectional view, corresponding to FIG. 4, but showing a modified form of a collar.

FIG. 8 is an enlarged sectional view, showing a modified form of contrictor ring.

FIG. 9 is an enlarged fragmentary sectional view of another modified form of constrictor ring.

FIG. 10 is an enlarged fragmentary sectional view of a tube joint adapted for connection to an essentially non-deformable tube.

FIG. 11 is an end view of a U-tube and connectors for joining a pair of condenser or heat exchanger tubes.

FIG. 12 is a fragmentary side view of the connector shown in FIG. 11.

FIG. 13 is an enlarged fragmentary sectional view, taken through 13—13 of FIG. 12.

FIG. 14 is an enlarged fragmentary sectional view, similar to FIG. 13, but showing the construction adapted to a collar connected joint.

The present invention is directed to a constrictor ring tube joint; that is, a joint intended primarily but not limited to tubing such as aluminum, copper, brass, steel and the like. The invention is also primarily directed to tubing of relatively small size, but may be adapted to tubing of large diameter. In any case, it is essential that the tubing or at least the external tube or the coupling be capable of radial constriction under the forces applied in the course of assembly.

The construction shown in FIGS. 1 and 4 utilizes a pair of tubes 1, which are joined together by a collar 2. Preferably the material comprising the tube and collar is the same to avoid electrolytic action or different thermal expansion. The collar may be slightly greater in wall thickness than the tubing and may be work hardened or otherwise treated so that its strength or hardness is greater than the tubing. The ends of the tubes received in the collar do not require special treatment except to be free of burrs and free of longitudinal scratches of any appreciable magnitude. The same conditions apply to the collar 2, except small bevels 2a may be provided. The clearance tolerance between the tubes and the collar is such as to accommodate the variation in tubing and collar diameters which normally occur.

Each end of the collar 2 receives a constrictor ring 3, which may be formed of the same material as the collar and tube, or if of different material, may be coated to minimize electrolytic action. The constrictor ring 3 includes a conical bore 4, having a larger or leading end 5, provided with a slight bevel and a constricted or trailing end 6, preferably forming a relatively sharp corner.

The outer surface of the constrictor ring 3 includes a conical portion 7 and a cylindrical portion 8. The conical portion 7 diverges from the leading end 5 toward the trailing end so that the wall thickness of the constrictor ring increases toward the trailing end 6. While the constrictor ring may be cylindrical throughout, the conical portion 7 provides some weight reduction as the hoop stress is less at the leading end. The increase in diameter in the conical portion may be such that the hoop stress is uniform. To reduce the force required to press the ring on the collar, the ring may be provided with an internal coating of a lubricant, such as oil or a fluorocarbon. Preferably, however, a dry lubricant, such as Molybdenumdisulphide, may be used.

The tube joint, as shown in FIGS. 1 and 4, is assembled as follows:

The tubes 1 are placed in essentially abutting relation midway within the collar 2. While the tubes and collar are held in this position, a constrictor ring 3 is presented to each end of the collar 2, as shown at the left side of FIG. 4. It will be noted that the leading end of the ring 3 is capable of overlapping slightly the corresponding end of the collar, and that the small or rudimentary bevel 2a may converge toward the tip of the constrictor ring so that any lubricant which may be applied is squeezed between the collar and constrictor ring rather than scraped off. While each constrictor ring may be applied separately by axial pressure while applying restraining engagement to the opposite end of the collar 2, it is convenient to apply axial pressure simultaneously to both constrictor rings.

The internal dimension of the constricted or trailing edge of the constrictor ring is such that when the ring is forced on the collar, the collar is compressed radially a sufficient distance not only to press the collar against the tubing, but to compress the collar sufficiently that the tubing underlying the collar is also compressed radially. As the constrictor ring is moved on the collar inwardly from the extremity thereof, the protruding extremity tends to spring back slightly, forming essentially an obtuse V-angle 9, and a similar obtuse V-angle 10 is formed in the tube, as shown at the right side of FIG. 4. The amount of spring back, of course, depends upon the nature of the material comprising the tubing and the collar. If a soft aluminum or copper is used, the spring back is minimal. If the material be steel, such as stainless steel, a substantial spring back may occur. In either case, however, a fluid tight seal is formed. Furthermore, tests have shown that the connection formed between the collar and tube may be such that if tension is applied to the tube, the tube will fail before the connection is broken.

The increase in thickness from the leading end 5 to the trailing end 6 of the constrictor ring is such that although the radial outward force at the trailing end 6 substantially exceeds that at the leading end 5, the stress within the constrictor ring need never exceed the elastic limit of the material forming the constrictor ring. The slight radial expansion which may occur is well within the elastic limits of the material with the result that an elastic force is maintained against the collar 2 and the tube 1.

Reference is directed to FIGS. 2 and 5. The construction here illustrated differs only in that a bell end 11 is provided on one tube so that the bell end may be slipped over the normal end of the other tube. The bell end 11 performs the same function as the collar 2 and is deformed in a like manner. However, if the plain end of the tube bottoms against the inner shoulder 11a at the inner end of the bell 11, this bearing engagement may serve as a counter bearing for an installation tool, not shown, which bears against the outer shoulder 11b of the bell when the constrictor ring is forced into place.

In the forming of a conventional connection between tubing, solder or a meltable bonding agent is often placed in internal grooves provided in the collar, then, after assembly of the tubes therein, the solder or other bonding agent is heated so as to flow between the collar and tube and bond thereto. A similar connection may be augmented by the constrictor ring, as illustrated in FIG. 7, in which the collar 2 is provided with an internal groove 12 inwardly from each end, in which is initially placed a ring of solder or other bonding agent 13. When the initial ring of bonding agent is heated, the bonding agent is distributed between the collar and tube. Little or none of the bonding agent will flow between the constricted portions of the collar and tube due to the tight fit therebetween. If the collar and tubes are assembled and heated to distribute a bonding agent before application of the constrictor ring, an intervening coating, not shown, will occur between the constricted portions of the collar and tube.

Reference is directed to FIGS. 3 and 6. The construction here shown is essentially the same as that shown in FIG. 5, except that the constrictor ring 3 is provided with a tail ring 15, having a leading end 16 joined to the trailing end of the constrictor ring and forming therewith an internal shoulder 17. The tail ring has a conical bore 18, preferably sloping at a lesser angle than the bore 4 of the constrictor ring, and forming a trailing end 19 of lesser diameter than the leading end 16. The taper of the bore 18 may be merely enough to press the receiving end of the bell 11 tightly against the tubing although slight radial compression preload may occur. The tail ring provides a redundant seal and relieves the mail seal at 10 from the influence of external forces such as bending or vibration forces. More particularly, the bearing engagement between the extremity of the bell 11 and the tube therein in the plane of the trailing end 19 and the bearing engagement between the shoulder 11a and the extremity of the inner tube tend to reduce the effect of external loads in the main seal area 10.

Reference is now directed to FIG. 8 which illustrates a modification of the constrictor ring particularly suited for tubing of large diameter. The constrictor ring 21, here illustrated, is essentially three constrictor rings 3 joined end-to-end forming three beveled portions 4a, a leading end or portion 5a and three trailing ends or shoulders 6a. When applied to a collar, the operation of each portion is essentially the same as the previously described constrictor ring 3. While three portions are shown, two or four, or more, portions may be provided.

Reference is now directed to FIG. 9, which shows another modification of the constrictor ring. In this construction, the constrictor ring 3 is provided with an axial extension 22 at its trailing edge which clears the collar 2 or the bell end 11, and terminates in an internal flange 23, dimensioned to clear the inner tube. The flange forms a stop which limits the distance that the constrictor ring may be forced over the collar or outer tube.

Reference is now directed to FIG. 10. This construction is intended primarily for a tube 24, which is essentially non-deformable; for example, a tube formed of high strength alloys or a tube containing refractory material. The tube 24 is provided with a tapered end 25 and a series of shallow annular channels 26. A collar 2 is utilized; however, it is essential that the collar be formed of relatively yieldable material. Also, it is preferred to use a constrictor ring, similar to the constrictor ring 21. As the constrictor ring 21 is forced onto the collar 2, the material comprising the collar 2 flows partially into the channels 26 to form a mechanical interlock.

It is preferred that the collar 2 be provided with an internal flange 27 at its midportion, the flange having gradually tapered axial sides. In assemblying a pair of constrictor rings onto the collar, the constrictor rings may be moved toward each other by suitable annular tools, not shown. It is preferred that such tools be provided with an internal flange or shoulder so that after the constrictor rings have been moved a predetermined distance onto the collar, that the ends of the collar are engaged and subjected to an axial compression force as well as the radial compression force produced by the constrictor rings. The tapered end of the tube 24 and a corresponding tapered end of a companion tube or other member are initially pressed against the opposite sides of the internal flange 27 so that on axial compression of the collar, intimate contact is made between the tube and corresponding side of the flange 27. Some buckling of the collar may occur between the flange 27 and the portion of the collar 2 constrained by the constrictor ring, as indicated by 28, assuring a sealing connection between the extremity of the tube and the internal flange as well as the series of sealing connections provided in the regions of the channels 26.

Reference is directed to FIGS. 11, 12 and 13. The constricting collar and connector are particularly adapted for assemblying the components of condensers or heat exchangers. Condensers or heat exchangers are usually formed by a series of tubes, serially connected at their ends by U-tubes. More particularly, the U-tube 29 is provided with plain ends which are received in bell ends 11 of a pair of tubes 1. In the construction illustrated, particularly with reference to FIG. 13, the bell ends of the tubes have an elongated taper rather than an abrupt taper, as indicated by the tapered shoulders 11c and 11d. The constrictor ring 30 may be similar to the constrictor ring 3, but is provided at its leading end with a guide sleeve 31, having an internal bevel 5 at its leading end. Internally, the sleeve 31 is dimensioned to fit freely on the bell end 11. When the constrictor ring 30 is pressed onto the bell end, the relationship between the constrictor ring, bell end and extremity of the U-tube 29 is the same as previously described.

It will be noted that by reason of the presence of the U-tube, only a portion of the axial end of the constrictor ring is available for engagement by a pressing tool. By providing the sleeve 31, only that portion of the constrictor ring exposed, as indicated in FIG. 11, need be engaged.

As it is desirable to place the bell end 11 under some compression, the tool, not shown, which engages the constrictor ring may also engage the end of the bell after the constrictor ring has been pressed a predetermined distance thereon. An opposing force may be exerted by a tool fitting the tapered external shoulder 11d or the tube may be elsewhere held. The purpose being to apply the desired longitudinal compression of the bell so as to obtain firm contact between the extremity of the U-tube and the internal shoulder 11c. In accomplishing this, some buckling or expansion will occur in the region 32.

Reference is now made to FIG. 14. The construction shown particularly in FIG. 13 is also adapted to a connector involving a collar 2 and plain end tubes 1. In this case, the collar 2 is provided with an internal flange 27, similar to that shown in FIG. 10, and the constrictor rings may be similar to the constrictor ring 30; that is, provided with sleeves 31. However, a constrictor ring 3 may be used. As previously described, after the constrictor rings have been moved a predetermined distance onto the collar, the collar is subjected to axial compression to the extent that buckling 33 occurs at each side of the region provided with the internal flange 27.

If desired, the constrictor rings may be provided with the internal flange 23, as shown in FIG. 9.

It should be observed that with particular regard to the bell and tube construction of FIGS. 5 and 6 that, when the coupling is completed, the portion of the bell 11 between the shoulder 11a and the region 10 as well as the corresponding portion of the inner tube are under elastic strain and that the force may be such as to deform the end of the tube into sealing engagement with the shoulder 11a.

With most suitable materials, plastic deformation is minimal and there is an elastic balance between the tube, collar and constrictor ring which tends to increase the reliability of the coupling. Also, because the constrictor ring is under hoop tension, preferably close to its yield limit, the coupling may be separated by cutting a notch in the constrictor ring to cause it to break or snap and permit the collar and tube or tubes to be separated.

The present embodiments of this invention are to be considered in all respects as illustrative and not restrictive.

I claim:
1. A permanently sealed joint comprising:
   a peripherally continuous normally cylindrical tubular outer member;
   an inner member having a peripherally continuous normally cylindrical outer surface and being telescopically positioned in an end of said outer member, both said members being of a material having metal-like characteristics whereby they are capable of resilient recovery after being held deformed;
   a ring member of said material surrounding said outer member outwardly of said inner member, said ring member having a frusto-conical inner surface portion, the large diameter end of which is axially remote from said end of said outer member and of a diameter greater than the outer diameter of said outer member, the small diameter end of said inner surface terminating at a relatively abrupt shoulder facing but spaced inwardly from said end of said outer member and being of a diameter less than the normal outer diameter of said outer member whereby said ring member, adjacent said shoulder, distorts both said outer and inner members inwardly throughout a relatively narrow axial zone sufficiently to maintain resilient radial sealing pressure between said members, the end portions of said outer member being at least partially free of radial restraint and being resiliently expanded to a diameter, adjacent said shoulder, greater than the inner diameter of said shoulder and thereby locking said ring member against axial movement toward said end of said outer member; and
   that portion of said ring member in the region of said shoulder being of sufficient strength to maintain essentially its configuration and to maintain a resilient load on said outer and inner members thereby to retain said members essentially in their inwardly distorted condition.

2. A joint as defined in claim 1 wherein said inner member is a tubular member.

3. A joint as defined in claim 2 wherein said outer member is a collar having an inner member extending into each end thereof and a ring member at each end thereof.

4. A joint as defined in claim 1 including a coating of sealing material is between said inner and outer members.

5. A joint as defined in claim 2 wherein said collar is longitudinally compressed.

6. A joint as defined in claim 2 wherein said outer member is a bell formed on the end of a tubular member.

7. A joint as defined in claim 1 wherein the radial thickness of said ring member increases from the end thereof remote from said end of said outer member, to at least said shoulder.

8. A joint as defined in claim 1 wherein said ring member is provided with a tubular extension of an inner diameter at least as large as the outer diameter of said outer member, said tubular extension extending from said shoulder to about said end of said outer member.

9. A joint as defined in claim 7 wherein said tubular extension is provided with an inwardly directed flange engaging said end of said outer member.

10. A joint as defined in claim 7 wherein at least the outer end portion of said extension engages one of said inner and outer members to thereby resist bending at said joint.

11. A joint as defined in claim 1 wherein said ring member is provided with a plurality of said frustoconical surfaces and shoulders, arranged in tandem therein.

12. A joint as defined in claim 1 including a lubricant between said ring member and said outer member.

13. A joint as defined in claim 3 wherein one of said inner members is a U-shaped tube having a second collar, rings and further other member at the other end thereof.

* * * * *